(No Model.)
A. P. FERGUSON.
ROAD CART.
No. 501,776. Patented July 18, 1893.
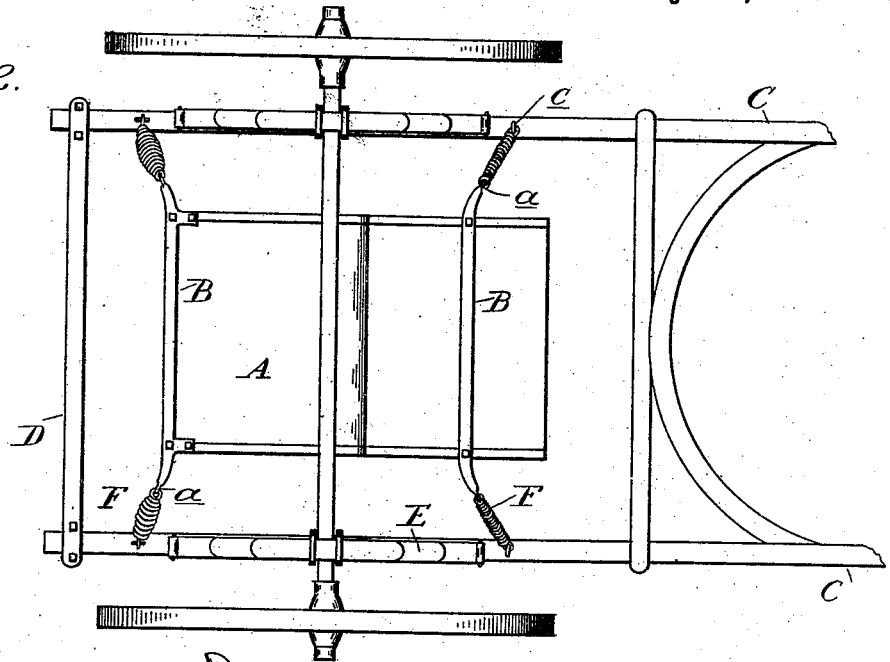
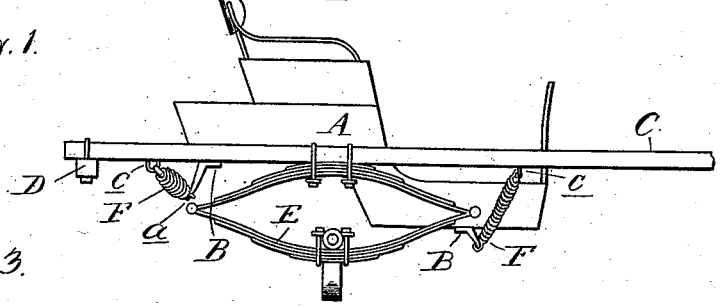
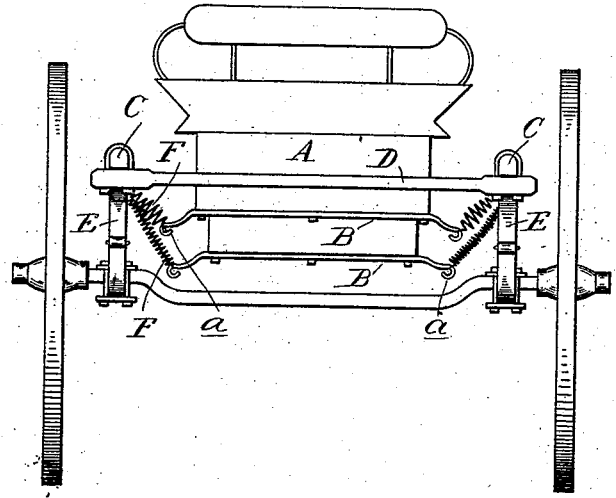
Witnesses
G. L. Hobbie
W. L. Dougherty
Inventor
Alvah P. Ferguson
By Thos. S. Sprague & Son
Attys.

UNITED STATES PATENT OFFICE.

ALVAH P. FERGUSON, OF ANN ARBOR, MICHIGAN.

ROAD-CART.

SPECIFICATION forming part of Letters Patent No. 501,776, dated July 18, 1893.

Application filed March 21, 1893. Serial No. 467,064. (No model.)

*To all whom it may concern:*

Be it known that I, ALVAH P. FERGUSON, a citizen of the United States, residing at Ann Arbor, in the county of Washtenaw and State of Michigan, have invented certain new and useful Improvements in Road-Carts, of which the following is a specification, reference being had therein to the accompanying drawings.

My invention more particularly relates to the class of two-wheeled shaft-vehicles, such as trotting carts, road carts, &c.; and it consists in the novel manner in which the body is supported to neutralize the horse motion and to prevent shocks from uneven roads or from obstacles over which the wheels may pass from being roughly communicated to the body of the vehicle, all as more fully hereinafter described in connection with the drawings in which—

Figure 1 is a side elevation of a two-wheeled vehicle embodying my invention. Fig. 2 is a plan from the under side. Fig. 3 is a rear elevation.

A is the body of the vehicle, which may be of any form suitable for the hereinafter described manner of supporting the same. For neatness of appearance however, I have selected what is known as the phaeton-shaped body provided with a rearwardly extending box. To the under side of this body I secure transversely the body, the bars B, one near the front end and one near the rear end. These bars I make long enough to project (more or less) beyond the sides of the body and their ends are formed with hooks or eyes *a*.

C are the shafts, they extend straight or nearly so along the sides of the body and project beyond the same at the rear, where they are united by a suitable cross bar D.

E are elliptic springs interposed between the shafts and at the axle in the vertical plane of the shafts. They are secured in any suitable manner to the axle and shafts. Preferably, however, I clip the springs to the under side of the axle so as to lower the shafts as much as possible.

F are coil springs connecting the hooked ends of the bars B with the shafts which are to this end provided with suitable hook or eye bolts *c*.

The body must have ample space within the supporting frame formed by the shafts and the front and rear cross bars to be freely suspended and have free lateral and end motion without touching the frame. Undue motion may be prevented by suitable check straps, but preferably I hang the coil springs so as to converge toward each other from their points of suspension whereby the said springs tend to counteract the lateral and end motion of the body. The degree of inclination best suited depends upon the stiffness of the springs and the load intended to be carried.

In practice the parts being constructed as described and shown it will be seen that normally the body is supported in perfect equipoise over the axle, and when the vehicle is traveling the coil springs counteract vertical as well as horizontal motion, and on account of their slow acting character the jerky horse motion is so modified and reduced that it loses entirely its unpleasant character. The elliptic springs form an elastic draft connection between the shafts and the axle and this takes the cart motion off the horse.

The peculiar combination of the springs which I use is important in the result obtained. Thus the elliptic springs being of the nature of the leaf spring are quick to react while the coil springs are quite slow. Thus the quick action and reaction of the elliptic springs in going over rough roads are in their effect upon the body and horse neutralized by the slower action of the coil springs.

It is immaterial whether the bars B extend entirely underneath the body or whether in in lieu thereof separate brackets are used. It is also within the spirit of my invention to use half elliptic springs or any other suitable combination of leaf springs for supporting the shafts upon the axle.

What I claim as my invention is—

1. The combination with the axle and wheels, of the shafts connected by cross bars to form a supporting frame, a body freely suspended by coil springs from and within said frame and elliptic springs connecting the shafts with the axle, substantially as described.

2. The combination with the axle and wheels, of the shafts connected by cross bars to form a supporting frame for the body, a body freely suspended within and from said frame by coil springs secured to the shafts, cross bars under the front and rear ends having projecting ends to which the lower ends of the coil springs are secured, and elliptic springs connecting the shafts with the axle and forming the draft connection, substantially as described.

3. The combination with the axle and the shafts intermediately supported thereupon, of a suitable body, and coil springs secured to the shafts and angularly suspending the body at or near its front and rear ends from said shafts, substantially as described.

4. The combination with the axle and body, of the shafts extending beyond the body and having their rear ends connected by a cross bar, the elliptic springs secured respectively to the under side of the shafts and axle intermediately between the same and forming the draft connection, and coil springs suspending the body in front and rear from the shafts, said coil springs being placed angularly inclined toward each other and connected to the ends of cross-bars secured underneath the body, substantially as described.

In testimony whereof I affix my signature in presence of two witnesses.

ALVAH P. FERGUSON.

Witnesses:
M. B. O'DOGHERTY,
N. L. LINDOP.